(12) United States Patent
Sun et al.

(10) Patent No.: US 11,002,212 B1
(45) Date of Patent: May 11, 2021

(54) SIMULINK MODELING METHOD FOR MECHANICAL HYDRAULIC DEVICE OF AEROENGINE FUEL REGULATOR

(71) Applicant: DALIAN UNIVERSITY OF TECHNOLOGY, Liaoning (CN)

(72) Inventors: Ximing Sun, Liaoning (CN); Xian Du, Liaoning (CN); Rui Wang, Liaoning (CN); Yanhua Ma, Liaoning (CN); Xinyue Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/764,304

(22) PCT Filed: Mar. 15, 2019

(86) PCT No.: PCT/CN2019/078244
§ 371 (c)(1),
(2) Date: May 14, 2020

(87) PCT Pub. No.: WO2020/186382
PCT Pub. Date: Sep. 24, 2020

(51) Int. Cl.
*F02D 41/20* (2006.01)
*F02D 41/22* (2006.01)
(Continued)

(52) U.S. Cl.
CPC ............. *F02D 41/20* (2013.01); *F02D 41/18* (2013.01); *F02D 41/222* (2013.01); *F02D 41/28* (2013.01);
(Continued)

(58) Field of Classification Search
CPC ........ F02D 41/20; F02D 41/222; F02D 41/28; F02D 41/18; F02D 2041/286;
(Continued)

(56) References Cited

U.S. PATENT DOCUMENTS

2007/0073467 A1* 3/2007 Hill ...................... F02D 19/024
701/105
2009/0319155 A1* 12/2009 Dyrbusch ................. F01N 3/36
701/103

(Continued)

FOREIGN PATENT DOCUMENTS

| CN | 201606091 U | 10/2010 |
| CN | 104314696 A | 1/2015 |
| WO | WO 2014/039800 A1 | 3/2014 |

OTHER PUBLICATIONS

Meng, Wu-Sheng et al.; "Pneumatic Control Hydraulic Back Pressure Valve Simulation and Design Based on Simulink"; Control Engineering of China, vol. 21, No. 2, Mar. 20, 2014,pp. 204-209.

*Primary Examiner* — Sizo B Vilakazi
(74) *Attorney, Agent, or Firm* — Muncy, Geissler, Olds & Lowe, P.C.

(57) ABSTRACT

A Simulink modeling method for a mechanical hydraulic device of an aeroengine fuel regulator is proposed. The Simulink modeling method can implement high precision simulation of a mechanical hydraulic device of an engine fuel conditioning system, and greatly increase the simulation speed as compared with the existing modeling simulation in AMESim; solve the problem of a double-layered nested algebraic loop occurring when the mechanical hydraulic device is modeled in Simulink, and improve the simulation precision of the system. In addition, because of having certain universality, the resolving method for a double-layered nested algebraic loop can be generalized to resolve other types of algebraic loops. Meanwhile, the parameters of the simulation model provided by the present invention can be conveniently modified, and can provide a reference for modeling simulation of mechanical and hydraulic devices of engine fuel conditioning systems of other types.

1 Claim, 5 Drawing Sheets

(51) Int. Cl.
*F02D 41/28* (2006.01)
*F02D 41/18* (2006.01)

(52) U.S. Cl.
CPC .. *F02D 2041/202* (2013.01); *F02D 2041/223* (2013.01); *F02D 2041/286* (2013.01)

(58) Field of Classification Search
CPC ........ F02D 2041/202; F02D 2041/223; B60W 2050/0037; G06N 20/00
See application file for complete search history.

(56) References Cited

U.S. PATENT DOCUMENTS

| | | |
|---|---|---|
| 2018/0113963 A1* | 4/2018 | Kordon .................... G06F 30/20 |
| 2018/0268624 A1* | 9/2018 | Remboski ............ B60W 50/045 |
| 2019/0309656 A1* | 10/2019 | Liu ......................... F01K 23/10 |

* cited by examiner

SIMULINK MODELING METHOD FOR MECHANICAL HYDRAULIC DEVICE OF AEROENGINE FUEL REGULATOR

TECHNICAL FIELD

The present invention proposes a modeling method for a mechanical hydraulic device of an aeroengine fuel regulator based on Simulink, which belongs to the technical field of modeling for mechanical hydraulic devices of aeroengines.

BACKGROUND

The background on which the present invention relies on is MATLAB/Simulink modeling for a mechanical hydraulic device of a certain type of aeroengine fuel conditioning system.

A fuel conditioning system is a core component for automatic control of an engine, and is also a high-risk area. Under the digital demand of the aeroengine fuel conditioning system at present, it is particularly important to build a mathematical model for the fuel conditioning system. The aeroengine fuel conditioning system mainly comprises three parts, i.e. a fuel pump, a mechanical hydraulic device and a fuel dispenser, wherein the mechanical hydraulic device includes a metering valve, a differential pressure valve, an oil return valve and other precision components, and has the disadvantages of complex structure, long design and manufacturing cycles and high costs, so it is necessary to model and simulate the mechanical hydraulic device of the fuel conditioning system to shorten the development cycle and save costs. By means of modeling simulation, on the one hand, the performance of the original scheme can be predicted, the advantages and disadvantages of the scheme can be evaluated, the defects in the system design can be found and corrected early, and the best design scheme can be determined; and on the other hand, the direction of improvement and modification and optimization can be determined, the product development cycle can be shortened, and the danger of field test can be effectively avoided. The built model and the simulation result thereof can not only be used as a reference when testing and debugging the mechanical hydraulic device of the fuel conditioning system, but also provide a reference for the innovative design of the product. The built real-time model can be further used for hardware-in-the-loop simulation of aeroengine control systems. Therefore, it is necessary to study the modeling and simulation of the mechanical hydraulic device of the engine fuel conditioning system.

According to the existing literature, modeling and simulation performed on the mechanical hydraulic device of the engine fuel conditioning system are mainly performed on an AMESim platform. Compared with the MATLAB/Simulink platform, the AMESim platform has the advantage that the mechanical hydraulic device model built thereon is more intuitive, but has the disadvantage that the simulation calculation speed far less than Simulink. Because various components in the mechanical hydraulic device affect each other, modeling in Simulink involves a complex double-layered nested algebraic loop problem. By means of the present invention, the mechanical hydraulic device of the aeroengine fuel conditioning system in MATLAB/Simulink is modeled using an analytical method according to the structure and flow continuity of the components and the force balance principle, and is simulated. Meanwhile, the high precision simulation of the system is implemented by resolving the double-layered algebraic loop in the model using the method of inserting high frequency delay in the feedback loop.

SUMMARY

In order to implement high speed and high precision simulation of a mechanical hydraulic device of an aeroengine fuel conditioning system and solve the problem of a double-layered nested algebraic loop occurring in modeling and simulation of the mechanical hydraulic device of the fuel conditioning system, the present invention provides a Simulink modeling method for a mechanical hydraulic device of an aeroengine fuel regulator.

The technical solution of the present invention is as follows:

A Simulink modeling method for a mechanical hydraulic device of an aeroengine fuel regulator, comprising the following steps:

S1. modeling a main differential pressure control loop of a mechanical hydraulic device of an engine fuel conditioning system using an analytical method, the main differential pressure control loop including a metering valve, an oil return valve and a differential pressure valve;

modeling the main differential pressure control loop of the mechanical hydraulic device comprises the following steps:

S1.1. first, determining input and output parameters of the metering valve, the input parameters including metering valve flow Qjiliang, metering valve expected displacement ExDisp, fuel density Density and after metering valve fuel pressure Pout_JL, and the output parameters including metering valve displacement Disp, fore metering valve fuel pressure Pin_JL and metering valve flow FUEL_Supply;

S1.2. since the metering valve internally includes a displacement calculation module and a pressure calculation module, inputting the metering valve expected displacement ExDisp into the displacement calculation module, obtaining a current input signal of an electrohydraulic servo valve through PID control, obtaining an output flow according to input and output characteristics of the electrohydraulic servo valve, obtaining a moving speed of the metering valve by dividing the output flow by area, and obtaining displacement of the valve through the integral link; and for the pressure calculation module, according to the mass flow formula:

$$Q = \mu A \sqrt{\Delta P * 2\rho}$$

obtaining $$Pin\_JL = \frac{Q^2}{\mu^2 A^2} * \frac{1}{2\rho} + Pout\_JL$$

where Q represents fuel mass flow of the metering valve, u represents flow coefficient, A represents flow area of the metering valve, $\Delta P$ represents difference between fore and after metering valve pressures, and $\rho$ represents fuel density;

S1.3. determining input and output parameters of the oil return valve, the input parameters including after gear pump fuel pressure $P_1$, output fuel pressure $P_2$ of the differential pressure valve, after stopping valve fuel pressure $P_{2P}$, fuel supply quantity Q_chilunbeng of the gear pump and fuel density Density, and the output parameters including fuel return quantity Q_huiyou of the oil return valve, oil return valve displacement X, and metering valve flow Q_jiliang;

S1.4. since the oil return valve internally includes a displacement calculation module and a flow calculation module, calculating the displacement according to the following calculation formula:

$$X = X_1 + X_2$$

where X represents displacement of the oil return valve, $X_1$ represents displacement of a left spring of the oil return valve, and $X_2$ represents displacement of an intermediate spring of the oil return valve, for the left spring, $$P_1*A_1 + P_{2P}*A_2 - P_{2P}*A_3 - P_2*A_4 = K_2*(X_2 + X_{20})$$

and for the intermediate spring, $$P_1*A_5 - P_{2P}*A_5 = K_1*(X_1 + X_{10})$$

where $P_1$ represents fore metering valve fuel pressure, that is, after gear pump fuel pressure; $A_1$ represents area of action of fuel of the gear pump, and $P_{2P}$ represents after stopping valve fuel pressure; $A_2$ represents left area of action of a left spring chamber, $A_3$ represents right area of action of the intermediate spring, $P_2$ represents output fuel pressure of the differential pressure valve, $A_4$ represents area of action of the left spring chamber, $A_5$ represents equivalent area of action of the intermediate spring, $K_1$ represents stiffness coefficient of the intermediate spring, $X_{10}$ represents initial compression amount of the intermediate spring, $K_2$ represents stiffness coefficient of the left spring, and $X_{20}$ represents initial compression amount of the left spring;

S1.5. calculating the flow area of the oil return valve through the total displacement of the oil return valve output by the displacement calculation module, then substituting same into the mass flow formula to obtain the fuel return quantity of the oil return valve, and subtracting the fuel return quantity from the after total flow of the gear pump to obtain the fuel flow of the metering valve;

S1.6. determining input and output parameters of the differential pressure valve, the input parameters including after gear pump fuel pressure $P_1$ and spring chamber fuel pressure P_tanhuangqiang of the differential pressure valve, and the output parameter including fuel pressure $P_2$ of control fuel the differential pressure valve;

S1.7. performing calculation on the differential pressure valve mainly using the spring compression module and the pressure calculation module, wherein the mathematical model of the spring compression module is:

$$P_1*S_1 + P_{tan}*(S_4 - S_2 - S_3) + P_2*S_5 + K_1*(X - 0.0001)*(X \geq 0.0001) + f_{10} - f_{20} = (K_1 + K_2)*X$$

where $P_{tan}$ represents spring chamber fuel pressure of the differential pressure valve, $f_{10}$ represents pretightening force of bellows of the differential pressure valve, $f_{20}$ represents pretightening force of spring of the differential pressure valve, $S_1$ represents area of action of fuel of the bellows, $S_2$ represents area of action of fuel of the spring chamber, $S_3$ represents area of action of low pressure fuel at the upper end of a nozzle baffle, $S_4$ represents area of action of low pressure fuel at the lower end of the nozzle baffle, $S_5$ represents area of action of the control fuel, $K_2$ represents stiffness coefficient of the spring, $K_1$ represents stiffness coefficient of the bellows, and the main modeling basis of the pressure calculation module is the following partial pressure formula:

$$P_2 = \frac{S_6^2 * P_1 + S_7^2 * P_{tan}}{S_6^2 + S_7^2}$$

where $S_6$ represents area of action of fore fuel of the metering valve, and $S_7$ represents area of action of fuel of the spring chamber;

S1.8. adding a displacement-area interpolation table in the metering valve and differential pressure valve module, and according to the structure principle of the metering valve, the oil return valve and the differential pressure valve, connecting inputs and outputs of the three valves, to form a main differential pressure control loop;

modeling the main fuel circuit of the mechanical hydraulic device comprises the following steps:

S1.9. according to the flow direction of the main fuel circuit, determining the constitution modules of the main fuel circuit, including a gear pump, an oil return valve, a metering valve, a high pressure shut-off valve, a throttle nozzle and a combustion chamber;

S1.10. according to the flow equation of the main fuel circuit, determining the flow differential pressure equation of each module by the backward induction idea of the differential pressure, and implementing same in Simulink;

S1.11. in addition to the mass flow equation, the mathematical model of the high pressure shut-off valve also includes a displacement calculation module, the pressure of action of fuel of the upper chamber thereof is:

$$F_I = P_B * (D_P^2 - D_R^2) * \frac{\pi}{4}$$

where $P_B$ represents fuel pressure at inlet of the high pressure shut-off valve, $D_P$ represents diameter of upper chamber of the valve, $D_R$ represents rod diameter of upper chamber of the valve, and in the equilibrium state, the fuel pressure and spring force satisfy the following equation:

$$F_I = P_{sp}*A_L + K_s*X + F_0$$

where $A_L$ represents area of action of fuel of the spring chamber, $P_{sp}$ represents fuel pressure of the spring chamber, $F_0$ represents pretightening force of the spring, $K_s$ represents stiffness coefficient of the spring, X represents displacement of the spring, that is, displacement of the high pressure shut-off valve, obtaining the flow area of the high pressure shut-off valve through the displacement-area interpolation table, and feeding same back to the mass flow equation of the pressure calculation module;

modeling other components of the mechanical hydraulic device comprises the following steps:

S1.12. selecting a Switch module to switch the operating state of the stopping valve: if the input signal of the stopping valve is 0, outputting low pressure fuel to the spring chamber of the high pressure shut-off valve, so the high pressure shut-off valve opens and the engine operates normally; and if the input signal of the stopping valve is greater than 0, outputting high pressure fuel to the spring chamber of the high pressure shut-off valve, so the high pressure shut-off valve closes and the fuel conditioning system stops;

S1.13. selecting the Switch module to switch the operating state of an overturn protection device: if the overshoot signal is 0, that is, the engine normally operates, and the overturn protection device does not operate, directly inputting the after control fuel of a switch valve to the spring chamber of the differential pressure valve; and if the engine overturns and the overshoot signal is not 0, introducing, by the overturn protection device, the low pressure fuel into the spring chamber of the differential pressure valve, so the flow of the metering valve is reduced, and the overturn protection function is achieved;

S1.14. selecting the Switch module to switch the operating state of the switch valve: in the case of non-stopping state, both the upper chamber and lower chamber of the switch valve are in communication with the fuel tank, thereby outputting low pressure fuel to the spring chamber of the differential pressure valve; and in the case of stopping state, the lower chamber of the switch valve is in communication with the high pressure fuel, and at this moment, according to the partial pressure formula, by the same as the partial pressure principle as the differential pressure valve, the output fuel pressure of the switch valve is obtained;

S2. modeling the main fuel circuit for fuel of the mechanical hydraulic device, that is, the fuel circuit from the gear pump to the fuel dispenser through the metering valve, the high pressure shut-off valve and the throttle nozzle, according to the pressure backward induction idea;

S3. after modeling the main differential pressure control loop and the main fuel circuit, continuing to build models for other components of the mechanical hydraulic device in Simulink, including the stopping valve and the switch valve;

S4. for the double-layered nested algebraic loops occurring in model simulation, resolving the algebraic loops using the method of inserting high frequency delay, and thus improving the model simulation speed and precision;

resolving the double-layered nested algebraic loops in the model comprises the following steps:

S4.1. inserting high-frequency delay in the form of $$\frac{G(s)}{1+G(s)}$$

in the inner layer feedback loop of the high pressure shut-off valve, where $$G(s) = k_1 * \frac{1}{s},$$

and setting a parameter $k_1$ to make the high pressure shut-off valve output a correct result;

S4.2. inserting high-frequency delay in the form of $$\frac{G(s)}{1+G(s)}$$

in the inner layer feedback loop of the differential pressure valve, where $$G(s) = k_2 * \frac{1}{s},$$

and setting a parameter $k_2$ to make the differential pressure valve output a correct result;

S4.3. inserting high-frequency delay in the form of $$\frac{G(s)}{1+G(s)}$$

in the outer layer control loop of the metering valve, where $$G(s) = k_3 * \frac{1}{s},$$

and setting a parameter $k_3$ to make the control loop of the metering valve output a correct result;

S4.4. adjusting the parameters $k_1$, $k_2$, $k_3$, so that the inner layer frequency of the algebraic loop is higher than the outer layer frequency, to achieve resolving of the double-layered nested algebraic loops, and adjusting the parameters to the state where the system operates stably and outputs a correct result;

S5. according to the field test data, correcting the PID module in the model and system input and output to achieve high precision simulation of the mechanical hydraulic device of the aeroengine fuel conditioning system.

The present invention has the advantageous effects that: the Simulink modeling method for a mechanical hydraulic device of an aeroengine fuel regulator proposed by present invention can implement high precision simulation of the mechanical hydraulic device of the engine fuel conditioning system, and greatly increase the simulation speed as compared with the existing modeling simulation in AMESim; solve the problem of a double-layered nested algebraic loop occurring when modeling in Simulink, and improve the simulation precision of the system. In addition, because of having certain universality, the resolving method for a double-layered nested algebraic loop can be generalized to resolve other types of algebraic loops. Meanwhile, the parameters of the simulation model provided by the present invention can be conveniently modified, and can provide a reference for modeling simulation of mechanical and hydraulic devices of engine fuel conditioning systems of other types.

DETAILED DESCRIPTION

Figure 1:
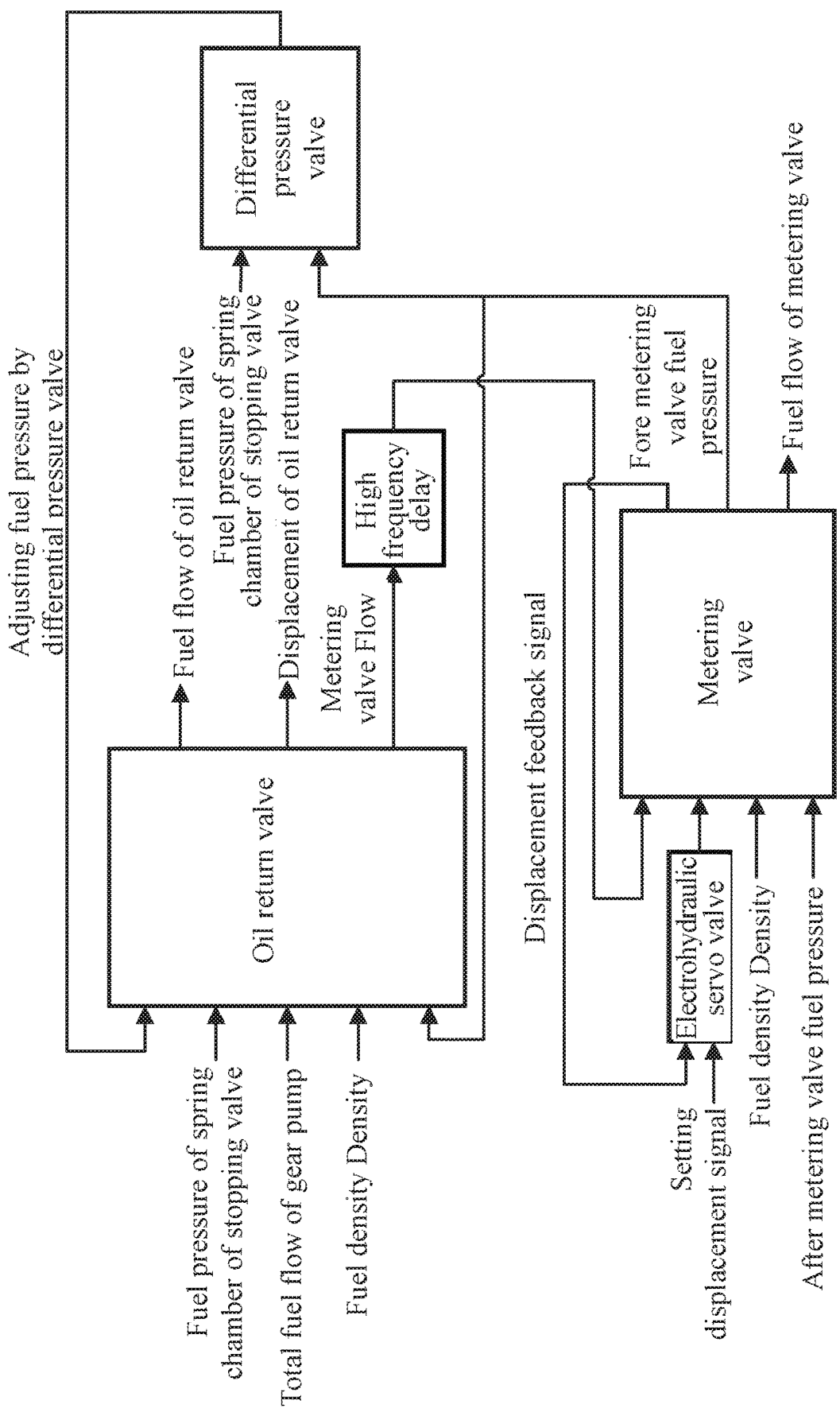
FIG. 1 is a schematic diagram showing a modeling mechanism for a main control loop of a mechanical hydraulic device of an aeroengine fuel conditioning system.
Figure 2:
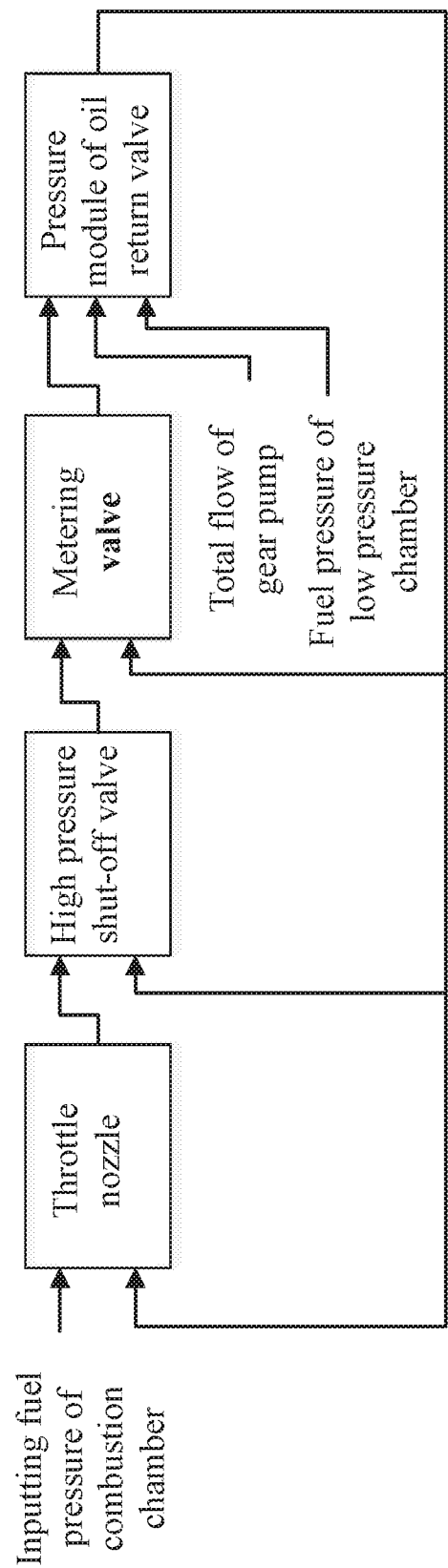
FIG. 2 is a schematic diagram showing a modeling mechanism for a main fuel circuit of a mechanical hydraulic device of an aeroengine fuel conditioning system.
Figure 3:
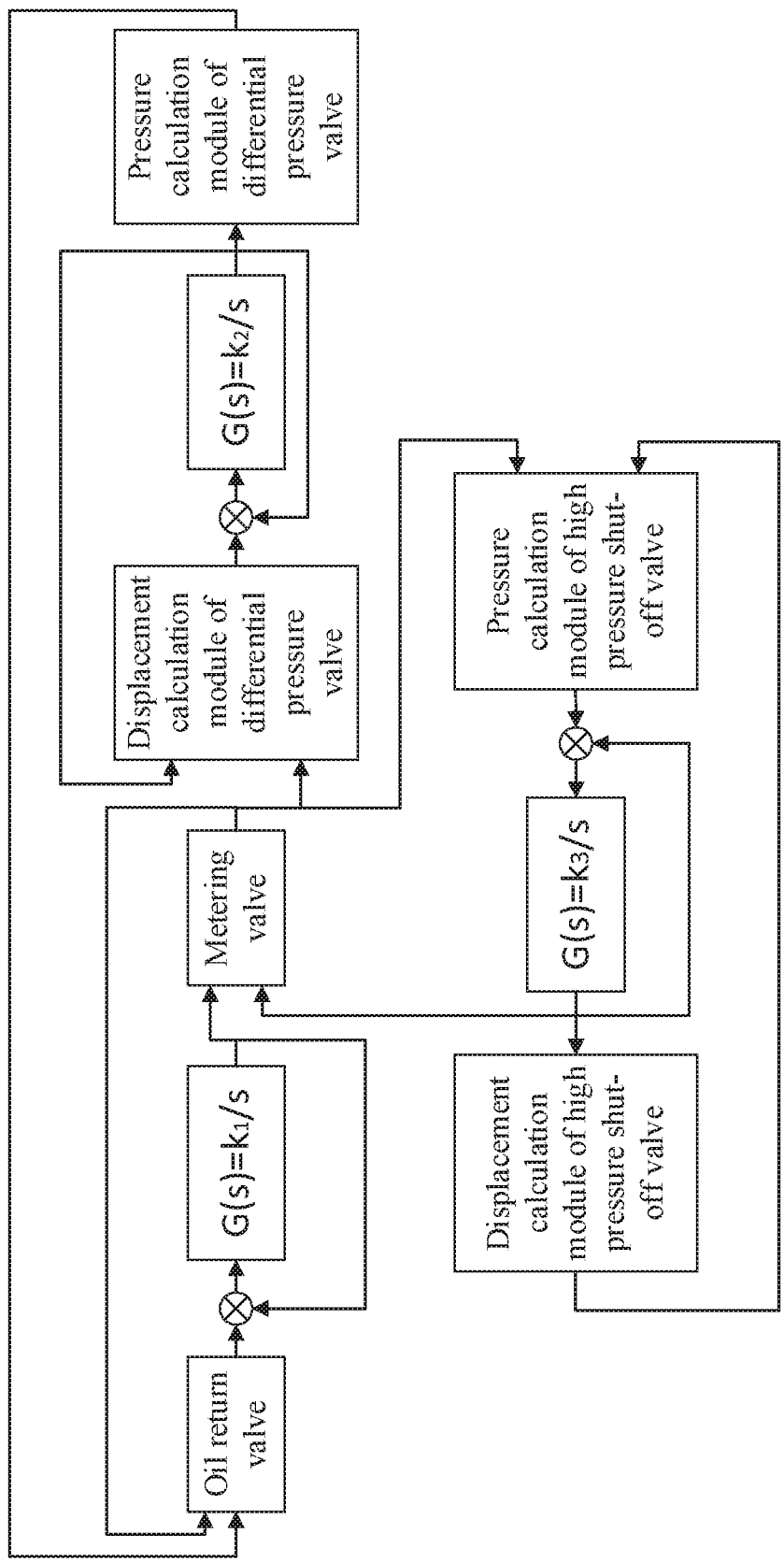
FIG. 3 is a schematic diagram showing a resolving method for a double-layered nested algebraic loop of a Simulink model of a mechanical hydraulic device of an aeroengine fuel conditioning system.
Figure 4:
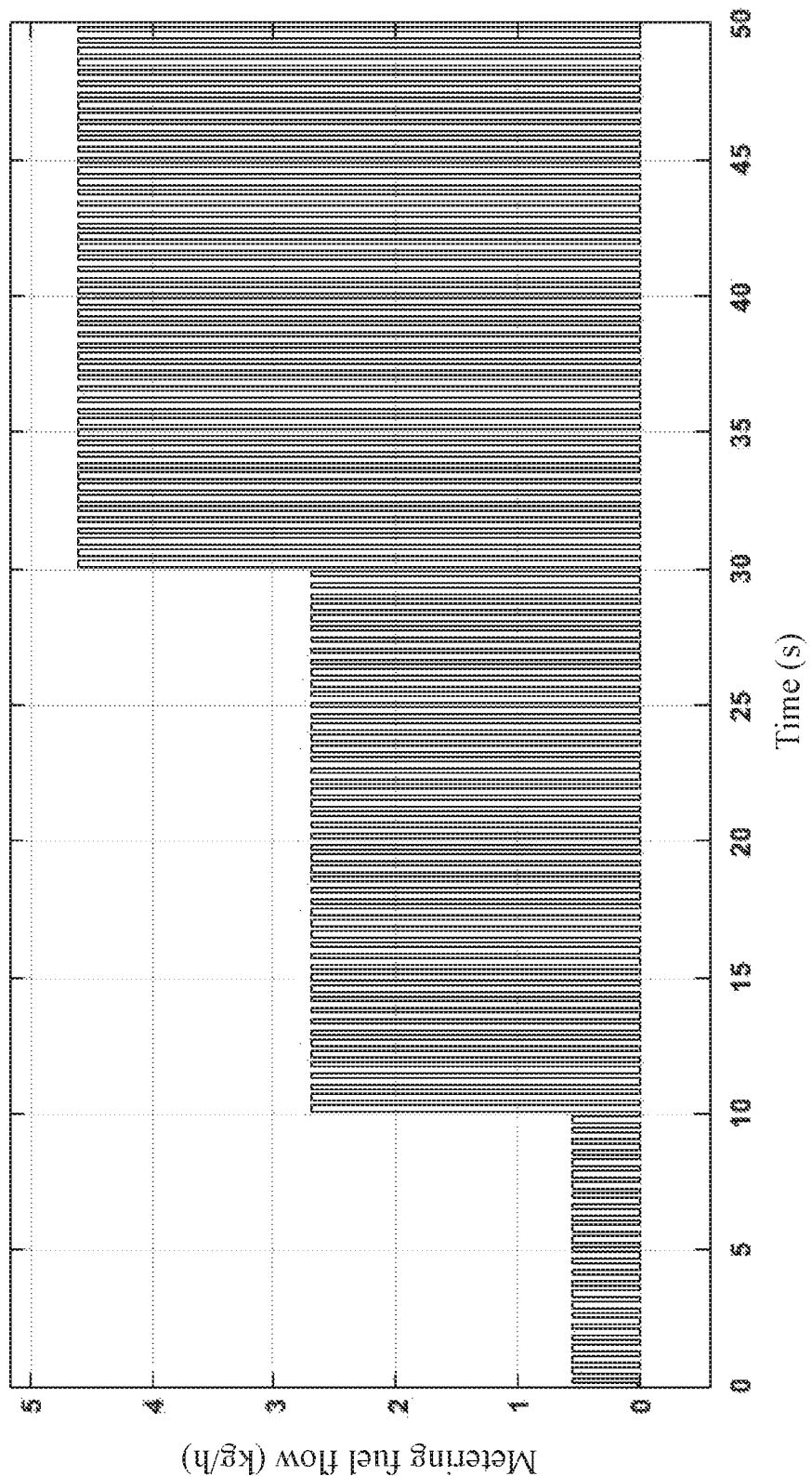
FIG. 4 is a waveform diagram showing oscillation of a double-layered nested algebraic loop.
Figure 5:
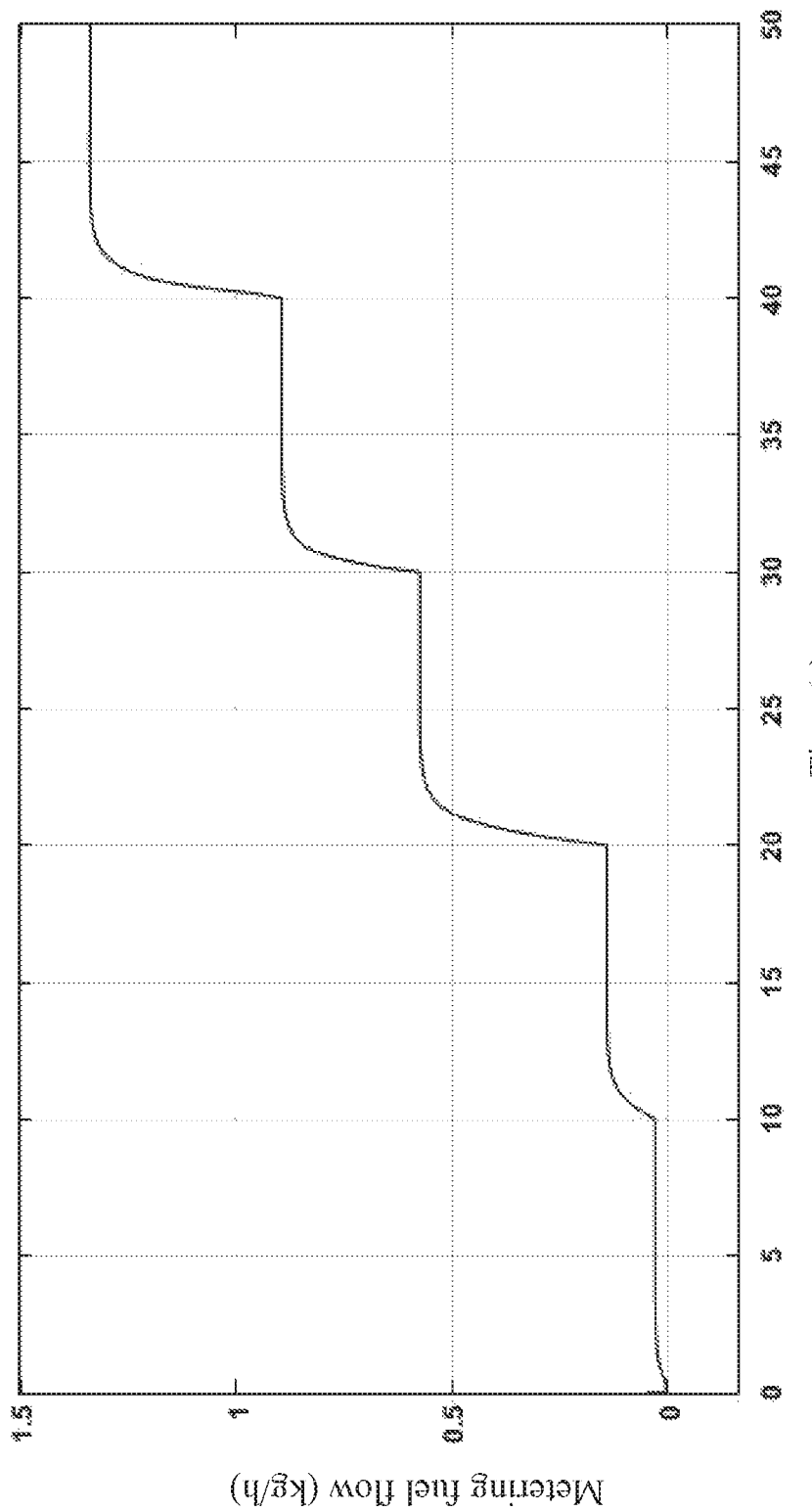
FIG. 5 is a waveform diagram showing a resolving effect of a double-layered nested algebraic loop.

The present invention is further described below in combination with the drawings. A Simulink modeling method for a mechanical hydraulic device of an aeroengine fuel regulator, comprising the following steps:

S1. modeling a main differential pressure control loop of a mechanical hydraulic device of an engine fuel conditioning system using an analytical method, the main differential pressure control loop including a metering valve, an oil return valve and a differential pressure valve;

S2. modeling the main fuel circuit for fuel of the mechanical hydraulic device, that is, the fuel circuit from the gear pump to the fuel dispenser through the metering valve, the high pressure shut-off valve and the throttle nozzle, according to the pressure backward induction idea;

S3. after modeling the main differential pressure control loop and the main fuel circuit, continuing to build models for other components of the mechanical hydraulic device in Simulink, including the stopping valve and the switch valve;

S4. for the inner layer algebraic loop of the high pressure shut-off valve, the inner layer algebraic loop of the differential pressure valve and the outer layer algebraic loop of the control loop of the metering valve, resolving the algebraic loops using the method of inserting high frequency delay, and thus improving the model simulation speed and precision;

S5. according to the field test data, correcting the PID module in the model and system input and output to achieve high precision simulation of the mechanical hydraulic device of the aeroengine fuel conditioning system;

wherein as shown in FIG. 1, modeling the main differential pressure control loop of the mechanical hydraulic device comprises the following steps:

S1. first, determining input and output parameters of the metering valve, the input parameters including metering valve flow Qjiliang, metering valve expected displacement ExDisp, fuel density Density and after metering valve fuel pressure Pout_JL, and the output parameters including metering valve displacement Disp, fore metering valve fuel pressure Pin_JL and metering valve flow FUEL_Supply;

S2. since the metering valve internally includes a displacement calculation module and a pressure calculation module, making a difference, by the displacement calculation module, between the input metering valve expected displacement ExDisp and the displacement feedback signal, obtaining a current input signal of an electrohydraulic servo valve through linear transformation and PID control, calculating the output flow according to the proportional relationship between the input and output of the electrohydraulic servo valve, converting the output flow into volume flow, obtaining a moving speed of the metering valve by dividing the volume flow by area, obtaining displacement of the valve through the integral link, modeling, by the pressure calculation module, mainly based on the mass flow formula $$Q=\mu A\sqrt{\Delta P*2\rho}$$

and according to the mass flow formula, obtaining:

$$\text{Pin\_JL} = \frac{Q^2}{\mu^2 A^2} * \frac{1}{2\rho} + \text{Pout\_JL}$$

where Q represents fuel mass flow of the metering valve, flow coefficient $\mu=0.71$, A represents flow area of the metering valve, $\Delta P$ represents difference between fore and after metering valve pressures, fuel density $\rho=780$ kg/m$^3$, Pin_JL represents fore metering valve fuel pressure, and Pout_JL represents after metering valve fuel pressure;

S3. determining input and output parameters of the oil return valve, the input parameters including after gear pump fuel pressure $P_1$, after differential pressure valve fuel pressure $P_2$, after switch valve fuel pressure $P_{2P}$, and the fuel supply quantity Q_chilunbeng of the gear pump and fuel density Density, and the output parameters including fuel return quantity Q_huiyou of the oil return valve, oil return valve displacement X, and metering valve flow Q_jiliang;

S4. calculating the displacement of the oil return valve according to the formula as follows:

$$X=X_1+X_2$$

where X represents total displacement of the oil return valve, $X_1$ represent displacement of a left spring of the oil return valve, and $X_2$ represent displacement of an intermediate spring of the oil return valve, for the left spring, $$P_1*A_1+P_{2P}*A_2-P_{2P}*A_3-P_2*A_4=K_2*(X_2+X_{20})$$

and for the intermediate spring, $$P_1*A_5-P_{2P}*A_5=K_1*(X_1+X_{10})$$

where $P_1$ represents fore metering valve fuel pressure, i.e. after gear pump fuel pressure, $A_1$ represents area of action of fuel of the gear pump, $P_{2P}$ represents after stopping valve fuel pressure, $A_2$ represents left area of action of a left spring chamber, $A_3$ represents right area of action of the intermediate spring, $P_2$ represents output fuel pressure of the differential pressure valve, $A_4$ represents area of action of the left spring chamber, $A_5$ represents equivalent area of action of the intermediate spring, $K_1$ represents stiffness coefficient of the intermediate spring, $X_{10}$ represents initial compression amount of the intermediate spring, $K_2$ represents stiffness coefficient of the left spring, and $X_{20}$ represents initial compression amount of the left spring;

S5. calculating the flow area of the oil return valve through the total displacement of the oil return valve output by the displacement calculation module, then substituting same into the mass flow formula to obtain the fuel return quantity of the oil return valve, and subtracting the fuel return quantity from the after total flow of the gear pump to obtain the fuel flow of the metering valve;

S6. determining input and output parameters of the differential pressure valve, the input parameters including after gear pump fuel pressure $P_1$ and spring chamber fuel pressure P_tanhuangqiang of the differential pressure valve, and the output parameter including fuel pressure $P_2$ of control fuel of the differential pressure valve;

S7. performing calculation on the differential pressure valve mainly using the spring compression module and the pressure calculation module, wherein the mathematical model of the spring compression module is:

$$P_1*S_1+P_{tan}*(S_4-S_2-S_3)+P_2*S_5+K_1*(X-0.0001)*(X\geq 0.0001)+f_{10}-f_{20}=(K_1+K_2)*X$$

where $P_{tan}$ represents spring chamber fuel pressure of the differential pressure valve, $f_{10}$ represents pretightening force of bellows of the differential pressure valve, $f_{20}$ represents pretightening force of spring of the differential pressure valve, $S_1$ represents area of action of fuel of the bellows, $S_2$ represents area of action of fuel of the spring chamber, $S_3$ represents area of action of low pressure fuel at the upper end of a nozzle baffle, $S_4$ represents area of action of low pressure fuel at the lower end of the nozzle baffle, $S_5$ represents area of action of the control fuel, $K_2$ represents stiffness coefficient of the spring, $K_1$ represents stiffness coefficient of the bellows, and the main modeling basis of the pressure calculation module is the following partial pressure formula:

$$P_2 = \frac{S_6^2 * P_1 + S_7^2 * P_{tanhuangqiang}}{S_6^2 + S_7^2}$$

where $S_6$ represents area of action of fore fluid of the metering valve, and $S_7$ represents area of action of fuel of the spring chamber;

S8. adding a displacement-area interpolation table in the metering valve and differential pressure valve module of the main differential pressure loop, wherein in the metering valve, the displacement-area interpolation table converts the displacement of the valve spool of the metering valve into the flow area of the valve, and in the differential pressure valve, the displacement-area interpolation table converts the compression amount of the spring of the differential pressure valve into the area of action of fuel of the nozzle baffle valve; then, according to the relationship between inputs and outputs of the metering valve, the oil return valve and the differential pressure valve, connecting the three valves, to form a main differential pressure control loop;
as shown in FIG. 2, modeling the main fuel circuit of the mechanical hydraulic device comprises the following steps:
S1. according to the flow direction of the main fuel circuit, determining the constitution modules of the main fuel circuit, including a gear pump, an oil return valve, a metering valve, a high pressure shut-off valve, a throttle nozzle and a combustion chamber;
S2. according to the mass flow equation, determining the flow differential pressure equation of each module by the backward induction idea of the differential pressure, and implementing same in Simulink;
S3. in addition to the mass flow equation, the mathematical model of the high pressure shut-off valve also includes a displacement calculation module, the pressure of action of fuel of the upper chamber thereof is:

$$F_I = P_B * (D_P^2 - D_R^2) * \frac{\pi}{4}$$

where $P_B$ represents fuel pressure at inlet of the high pressure shut-off valve, $D_P$ represents diameter of upper chamber of the valve, $D_R$ represents rod diameter of upper chamber of the valve, and in the equilibrium state, the fuel pressure and spring force satisfy the following equation:

$$F_I = P_{sp} * A_L + K_s * X + F_0$$

where $A_L$ represents area of action of fuel of the spring chamber, $P_{sp}$ represents fuel pressure of the spring chamber, $F_0$ represents pretightening force of the spring, $K_s$ represents stiffness coefficient of the spring, X represents displacement of the spring, that is, displacement of the high pressure shut-off valve, obtaining the flow area of the high pressure shut-off valve through the displacement-area interpolation table, and feeding same back to the mass flow equation of the pressure calculation module;
modeling other components of the mechanical hydraulic device comprises the following steps:
S1. selecting a Switch module to switch the operating state of the stopping valve: if the input signal of the stopping valve is 0, outputting low pressure fuel to the spring chamber of the high pressure shut-off valve, so the high pressure shut-off valve opens and the engine operates normally; and if the input signal of the stopping valve is greater than 0, outputting high pressure fuel to the spring chamber of the high pressure shut-off valve, so the high pressure shut-off valve closes and the fuel conditioning system stops;
S2. selecting the Switch module to switch the operating state of an overturn protection device: if the overshoot signal is 0, that is, the engine normally operates, and the overturn protection device does not operate, directly inputting the after control fuel of a switch valve to the spring chamber of the differential pressure valve; and if the overshoot signal is not 0 and the engine overturns, introducing, by the overturn protection device, the low pressure fuel into the spring chamber of the differential pressure valve, so the flow of the metering valve is reduced, and the overturn protection function is achieved;
S3. selecting the Switch module to switch the operating state of the switch valve: in the case of non-stopping state, both the upper chamber and lower chamber of the switch valve are in communication with the fuel tank, thereby outputting low pressure fuel to the spring chamber of the differential pressure valve; and in the case of stopping state, the lower chamber of the switch valve is in communication with the high pressure fuel, and at this moment, according to the partial pressure formula, the calculation method for the output fuel pressure of the switch valve is as follows:

$$P_{switch} = \frac{S_8^2 * Pcb + S_9^2 * Psp}{S_8^2 + S_9^2}$$

where $P_{switch}$ represents output fuel pressure of the switch valve, $S_8$ represents throttle area of the upper chamber of the switch valve, $S_9$ represents throttle area of the lower chamber of the switch valve, Pcb represents fuel pressure of a low pressure fuel tank which is in communication with the upper chamber of the switch valve, and Psp represents fuel pressure of high pressure fuel of the output of the stopping valve in the stopping state, the output of the stopping valve being in communication with the lower chamber of the switch valve;
as shown in FIG. 3, resolving the double-layered nested algebraic loops in the model comprises the following steps:
S1. inserting high-frequency delay in the form of $$\frac{G(s)}{1 + G(s)}$$

in the inner layer feedback loop of the high pressure shut-off valve, where $$G(s) = k_1 * \frac{1}{s},$$

and setting a parameter $k_1$=1000 to make the high pressure shut-off valve output a correct result;
S2. inserting high-frequency delay in the form of $$\frac{G(s)}{1 + G(s)}$$

in the inner layer feedback loop of the differential pressure valve, where $$G(s) = k_2 * \frac{1}{s},$$

and setting a parameter $k_2$=1000 to make the differential pressure valve output a correct result;
S3. inserting high-frequency delay in the form of $$\frac{G(s)}{1 + G(s)}$$

in the outer layer control loop of the metering valve, where $$G(s) = k_3 * \frac{1}{s},$$

and setting a parameter $k_3$=200 to make the control loop of the metering valve output a correct result;

S4. resolving the double-layered nested algebraic loops since the parameters $k_1$, $k_2$, and $k_3$ meet the requirement that the inner layer frequency of the algebraic loop is higher than the outer layer frequency, wherein the waveform of the system oscillation caused by the double-layered nested algebraic loop is shown in FIG. 4, and the system output waveform after resolving the algebraic loop by inserting high frequency delay is shown in FIG. 5, and finally adjusting the parameters to the state where the system operates stably and outputs a correct result.

To sum up, the modeling method for a mechanical hydraulic device of an aeroengine fuel regulator based on Simulink proposed by the present invention is feasible, which can achieve the high speed and high precision simulation of the mechanical hydraulic device of the aeroengine fuel conditioning system, and can solve the problem of a double-layered nested algebraic loop in modeling simulation.

The invention claimed is:

1. A Simulink modeling method for a mechanical hydraulic device of an aeroengine fuel regulator, comprising the following steps:
- S1. modeling a main differential pressure control loop of a mechanical hydraulic device of an engine fuel conditioning system using an analytical method, the main differential pressure control loop including a metering valve, an oil return valve and a differential pressure valve;
- modeling the main differential pressure control loop of the mechanical hydraulic device comprises the following steps:
- S1.1. first, determining input and output parameters of the metering valve, the input parameters including metering valve flow Qjiliang, metering valve expected displacement ExDisp, fuel density Density and after metering valve fuel pressure Pout_JL, and the output parameters including metering valve displacement Disp, fore metering valve fuel pressure Pin_JL and metering valve flow FUEL_Supply;
- S1.2. since the metering valve internally includes a displacement calculation module and a pressure calculation module, inputting the metering valve expected displacement ExDisp into the displacement calculation module, obtaining a current input signal of an electrohydraulic servo valve through PID control, obtaining an output flow according to input and output characteristics of the electrohydraulic servo valve, obtaining a moving speed of the metering valve by dividing the output flow by area, and obtaining displacement of the valve through the integral link; and for the pressure calculation module, according to the mass flow formula:

$$Q = \mu A \sqrt{\Delta P * 2\rho}$$

obtaining $$\text{Pin\_JL} = \frac{Q^2}{\mu^2 A^2} * \frac{1}{2\rho} + \text{Pout\_JL}$$

where Q represents fuel mass flow of the metering valve, u represents flow coefficient, A represents flow area of the metering valve, $\Delta P$ represents difference between fore and after metering valve pressures, and $\rho$ represents fuel density;

- S1.3. determining input and output parameters of the oil return valve, the input parameters including after gear pump fuel pressure $P_1$, output fuel pressure $P_2$ of the differential pressure valve, after stopping valve fuel pressure $P_{2P}$, fuel supply quantity Q_chilunbeng of the gear pump and fuel density Density, and the output parameters including fuel return quantity Q_huiyou of the oil return valve, oil return valve displacement X, and metering valve flow Q_jiliang;
- S1.4. since the oil return valve internally includes a displacement calculation module and a flow calculation module, calculating the displacement according to the following calculation formula:

$$X = X_1 + X_2$$

where X represents displacement of the oil return valve, $X_1$ represents displacement of a left spring of the oil return valve, and $X_2$ represents displacement of an intermediate spring of the oil return valve, for the left spring, $$P_1*A_1 + P_{2P}*A_2 - P_{2P}*A_3 - P_2*A_4 = K_2*(X_2 + X_{20})$$

and for the intermediate spring, $$P_1*A_5 - P_{2P}*A_5 = K_1*(X_1 + X_{10})$$

where $P_1$ represents fore metering valve fuel pressure, that is, after gear pump fuel pressure; $A_1$ represents area of action of fuel of the gear pump, and $P_{2P}$ represents after stopping valve fuel pressure; $A_2$ represents left area of action of a left spring chamber, $A_3$ represents right area of action of the intermediate spring, $P_2$ represents output fuel pressure of the differential pressure valve, $A_4$ represents area of action of the left spring chamber, $A_5$ represents equivalent area of action of the intermediate spring, $K_1$ represents stiffness coefficient of the intermediate spring, $X_{10}$ represents initial compression amount of the intermediate spring, $K_2$ represents stiffness coefficient of the left spring, and $X_{20}$ represents initial compression amount of the left spring;
- S1.5. calculating the flow area of the oil return valve through the total displacement of the oil return valve output by the displacement calculation module, then substituting same into the mass flow formula to obtain the fuel return quantity of the oil return valve, and subtracting the fuel return quantity from the after total flow of the gear pump to obtain the fuel flow of the metering valve;
- S1.6. determining input and output parameters of the differential pressure valve, the input parameters including after gear pump fuel pressure $P_1$ and spring chamber fuel pressure P_tanhuangqiang of the differential pressure valve, and the output parameter including fuel pressure $P_2$ of control fuel of the differential pressure valve;
- S1.7. performing calculation on the differential pressure valve mainly using the spring compression module and the pressure calculation module, wherein the mathematical model of the spring compression module is:

$$P_1*S_1 + P_{tan}*(S_4 - S_2 - S_3) + P_2*S_5 + K_1*(X - 0.0001)* \\ (X \geq 0.0001) + f_{10} - f_{20} = (K_1 + K_2)*X$$

where $P_{tan}$ represents spring chamber fuel pressure of the differential pressure valve, $f_{10}$ represents pretightening force of bellows of the differential pressure valve, $f_{20}$ represents pretightening force of spring of the differential pressure valve, $S_1$ represents area of action of fluid of the bellows, $S_2$ represents area of action of fluid of the spring chamber, $S_3$ represents area of action of low pressure fuel at the upper end of a nozzle baffle, $S_4$ represents area of action of low pressure fuel at the lower end of the nozzle baffle, $S_5$ represents area of action of the control fuel, $K_2$ represents stiffness coefficient of the spring, $K_1$ represents stiffness coefficient of the bellows, and the main modeling basis of the pressure calculation module is the following partial pressure formula:

$$P_2 = \frac{S_6^2 * P_1 + S_7^2 * P_{tan}}{S_6^2 + S_7^2}$$

where $S_6$ represents area of action of fore fluid of the metering valve, and $S_7$ represents area of action of fluid of the spring chamber;

S1.8. adding a displacement-area interpolation table in the metering valve and differential pressure valve module, and according to the structure principle of the metering valve, the oil return valve and the differential pressure valve, connecting inputs and outputs of the three valves, to form a main differential pressure control loop;

modeling the main fuel circuit of the mechanical hydraulic device comprises the following steps:

S1.9. according to the flow direction of the main fuel circuit, determining the constitution modules of the main fuel circuit, including a gear pump, an oil return valve, a metering valve, a high pressure shut-off valve, a throttle nozzle and a combustion chamber;

S1.10. according to the flow equation of the main fuel circuit, determining the flow differential pressure equation of each module by the backward induction idea of the differential pressure, and implementing same in Simulink;

S1.11. in addition to the mass flow equation, the mathematical model of the high pressure shut-off valve also includes a displacement calculation module, the pressure of action of fluid of the upper chamber thereof is:

$$F_I = P_B * (D_P^2 - D_R^2) * \frac{\pi}{4}$$

where $P_B$ represents fuel pressure at inlet of the high pressure shut-off valve, $D_P$ represents diameter of upper chamber of the valve, $D_R$ represents rod diameter of upper chamber of the valve, and in the equilibrium state, the fluid pressure and spring force satisfy the following equation:

$$F_I = P_{sp} * A_L + K_s * X + F_0$$

where $A_L$ represents area of action of fluid of the spring chamber, $P_{sp}$ represents fuel pressure of the spring chamber, $F_0$ represents pretightening force of the spring, $K_s$ represents stiffness coefficient of the spring, X represents displacement of the spring, that is, displacement of the high pressure shut-off valve, obtaining the flow area of the high pressure shut-off valve through the displacement-area interpolation table, and feeding same back to the mass flow equation of the pressure calculation module;

modeling other components of the mechanical hydraulic device comprises the following steps:

S1.12. selecting a Switch module to switch the operating state of the stopping valve: if the input signal of the stopping valve is 0, outputting low pressure fuel to the spring chamber of the high pressure shut-off valve, so the high pressure shut-off valve opens and the engine operates normally; and if the input signal of the stopping valve is greater than 0, outputting high pressure fuel to the spring chamber of the high pressure shut-off valve, so the high pressure shut-off valve closes and the fuel conditioning system stops;

S1.13. selecting the Switch module to switch the operating state of an overturn protection device: if the overshoot signal is 0, that is, the engine normally operates, and the overturn protection device does not operate, directly inputting the after control fuel of a switch valve to the spring chamber of the differential pressure valve; and if the engine overturns and the overshoot signal is not 0, introducing, by the overturn protection device, the low pressure fuel into the spring chamber of the differential pressure valve, so the flow of the metering valve is reduced, and the overturn protection function is achieved;

S1.14. selecting the Switch module to switch the operating state of the switch valve: in the case of non-stopping state, both the upper chamber and lower chamber of the switch valve are in communication with the fuel tank, thereby outputting low pressure fuel to the spring chamber of the differential pressure valve; and in the case of stopping state, the lower chamber of the switch valve is in communication with the high pressure fuel, and at this moment, according to the partial pressure formula, by the same as the partial pressure principle as the differential pressure valve, the output fuel pressure of the switch valve is obtained;

S2. modeling the main fuel circuit for fuel of the mechanical hydraulic device, that is, the fuel circuit from the gear pump to the fuel dispenser through the metering valve, the high pressure shut-off valve and the throttle nozzle, according to the pressure backward induction idea;

S3. after modeling the main differential pressure control loop and the main fuel circuit, continuing to build models for other components of the mechanical hydraulic device in Simulink, including the stopping valve and the switch valve;

S4. for the double-layered nested algebraic loops occurring in model simulation, resolving the algebraic loops using the method of inserting high frequency delay, and thus improving the model simulation speed and precision;

resolving the double-layered nested algebraic loops in the model comprises the following steps:

S4.1. inserting high-frequency delay in the form of $$\frac{G(s)}{1 + G(s)}$$

in the inner layer feedback loop of the high pressure shut-off valve, where $$G(s) = k_1 * \frac{1}{s},$$

and setting a parameter $k_1$ to make the high pressure shut-off valve output a correct result;

S4.2. inserting high-frequency delay in the form of $$\frac{G(s)}{1 + G(s)}$$

in the inner layer feedback loop of the differential pressure valve, where $$G(s) = k_2 * \frac{1}{s},$$

and setting a parameter $k_2$ to make the differential pressure valve output a correct result;

S4.3. inserting high-frequency delay in the form of $$\frac{G(s)}{1 + G(s)}$$

in the outer layer control loop of the metering valve, where $$G(s) = k_3 * \frac{1}{s},$$

and setting a parameter $k_3$ to make the control loop of the metering valve output a correct result;

S4.4. adjusting the parameters $k_1$, $k_2$, $k_3$, so that the inner layer frequency of the algebraic loop is higher than the outer layer frequency, to achieve resolving of the double-layered nested algebraic loops, and adjusting the parameters to the state where the system operates stably and outputs a correct result;

S5. according to the field test data, correcting the PID module in the model and system input and output to achieve high precision simulation of the mechanical hydraulic device of the aeroengine fuel conditioning system.

\* \* \* \* \*